United States Patent Office

3,425,859
Patented Feb. 4, 1969

3,425,859
GLASS SURFACES HAVING DUAL PROTECTIVE, LABEL ACCEPTING COATINGS AND METHOD
Herman A. Steigelman, Lambertville, Mich., assignor to Owens-Illinois, Inc., a corporation of Ohio
No Drawing. Filed Oct. 23, 1965, Ser. No. 504,123
U.S. Cl. 117—72
Int. Cl. B32b 17/06
17 Claims

ABSTRACT OF THE DISCLOSURE

A glass surface having a label-accepting, protective coating and the method of producing such an article, the coating including a first layer of tin or titanium oxide and a second layer consisting essentially of the reaction product of polyvinyl alcohol and polyoxyethylene monostearate.

---

This application is a continuation-in-part of my earlier filed, copending application Ser. No. 391,304, filed Aug. 21, 1964, now abandoned.

The present invention relates to the treatment of glass surfaces which are subjected to abrasive contact with each other in the course of handling, filling and packaging operations and, more particularly, to a method for treating glass surfaces and articles to enhance their resistance to scratching and retain the strength characteristics of the glass. This invention further pertains to glass articles having improved scratch resistance and superior strength produced by the aforesaid method.

It is generally known that glass derives its strength from an unblemished surface and any scratches or surface imperfections which are present on its surface considerably decreases the strength of the glass and may, under extreme conditions reduce the strength to approximately one-fourth of its original value. Glass articles such as jars, bottles, tumblers and containers in general possess their maximum strength shortly after they are formed in the glass forming operation. However, this strength rapidly diminishes as the glass articles are handled in an abusive manner such as when they come into contact with each other and bump into each other or other surfaces as is the case in normal handling, packaging and shipping operations.

In the food and beverage processing field this problem is particularly acute because the glass containers are subjected to a number of processing cycles wherein they are successively washed, filled, closed and packaged for delivery. In spite of the precautions taken to minimize scratching and abusive handling, the containers nevertheless are subjected many times to washing, sterilizing and vacuum treatments depending, of course, on the particular products with which they are filled. All of these operations necessitate rubbing or contacting the glass in a number of ways which can cause scratching.

During each of these operations, bottles continuously come into contact with each other as they move from station to station and as they are handled by the various apparatus. Breakage of the containers during these handling operations is costly, particularly if the breakage occurs after the containers have been filled.

In an effort to minimize the loss of strength and the resulting breakage which is a direct result of the scratching and abrading of the glass surfaces during the aforesaid operations, various attempts have been made in the past to coat the exterior glass surfaces with an abrasion resistant coating of one type or another. Many of these coating compositions have been employed commercially and impart satisfactory scratch resistant properties to glassware of all types. A number of these methods have not been entirely satisfactory, however, and various shortcomings and disadvantages exist with respect to many of the prior art methods and compositions for rendering glass surfaces abrasion resistant. For example, in some instances, although the glass surfaces may be improved with respect to scratch and abrasion resistance, the affinity of the usual paper labeling adhesive for these surfaces is considerably reduced. As a result, it is difficult to apply paper labels to these surfaces. Frequently, the treated surfaces present a worse labeling surface than does the bare untreated glass.

In evaluating a protective coating for glass surfaces, it is desirable that the containers be coated with a composition which imparts satisfactory scratch resistance to the glass article, both when the glass surface is wet as well as when it is dry. Moreover, the coating utilized to impart the scratch resistance, must not be substantially affected by various washing cycles to which the glass container is subjected in the course of its normal filling operations.

Accordingly, it is an object of this invention to provide a method for forming a durable protective coating on a glass surface while avoiding the shortcomings and disadvantages of methods and compositions known and used in the past.

A further object of the present invention is to provide a thin, substantially transparent coating on a glass surface, which coating is highly resistant to abrasion while simultaneously subtantially maintaining the strength characteristics of the glass.

Another object of the invention is to provide a method of coating a glass surface so as to impart thereto improved scratch resistant properties, both in the wet and dry condition, thereby permitting the container to undergo normal handling, processing and shipping operations without materially decreasing the strength of the container due to scratches resulting from the jostling and rubbing of the glass surface with each other and with other surfaces.

A further object of this invention is to provide a method of coating a glass surface so as to improve the scratch and abrasion resistance of the glass surface and at the same time provide a surface that has a greater affinity for paper labeling adhesives than does the bare untreated glass.

A further object of this invention is to provide an article of manufacture having a glass surface and a tightly adherent thin, substantially colorless and transparent coating on the aforementioned glass surface, which coating imparts satisfactory scratch and abrasion resistant properties to the glass surface.

A further object of this invention is to provide glassware having a tightly adhering, thin, substantially colorless and transparent coating on its surface which coating imparts increased strength and resistance to the ware enabling it to withstand greater internal pressures without breakage.

In attaining the objects of this invention, one feature resides in treating the glass surface with a titanium or tin-containing compound which is capable of being pyrolyzed, i.e., chemically decomposed by the action of heat, to form oxides of titanium or tin on the glass surface while the surface is at a temperature above the pyrolyzing temperature of the compound, cooling the treated glass, such as by passing it through an annealing lehr, and applying to the cooled surface while it is at a temperature in the range of about 150 to about 450° F., a solution, dispersion or emulsion of a polymeric composition which tenaciously bonds to the metallic oxide layer on the glass, and then drying the coated surface.

Another feature of the present invention resides in applying to a titanium or tin oxide cooled glass surface, a solution of polyvinyl alcohol in admixture with polyoxyethylene monostearate.

The above objects and features, as well as other objects, features and advantages of the present invention will become apparent from the following detailed description thereof.

According to the present invention, a glass surface, which can be in the form of an article of manufacture such as a bottle, jar, tumbler or other container as well as sheet glass and the like, is treated soon after the article leaves the glass-forming machine. As the glass article is being conveyed to the annealing lehr, a compound containing tin or titanium is applied onto the exterior of the glass surface while the glass surface is at a temperature above the temperature at which the compound pyrolyzes. The range of temperatures necessary to pyrolyze the titanium or tin containing compounds varies between about 700° F. and 1300° F., depending upon the particular compound used, with the preferred range being from about 900 F. to about 1200° F.

The titanium or tin containing compound which is employed for purposes of the present invention is one which upon contact with the heated glass surface will react to form a substantially colorless, transparent layer or coating of an oxide of the metal, primarily $TiO_2$ or $SnO_2$, on the glass usrface. The oxide layer is tightly adherent to the surface of the glass and is believed to have an average thickness of up to about one micron, and preferably less than one micron.

Among the titanium-containing compounds suitable for purposes of the present invention are the alkyl titanates, preferably wherein the alkyl group contains from 1 to about 8 carbon atoms, and including tetrabutyl titanate, tetraisopropyl titanate, tetraethylhexyl titanate and the like. Also included among the suitable titanium-containing compounds are the titanium tetrahalides, and particularly titanium tetrachloride.

The tin compounds that may be used for the purpose of the present invention include both stannous and stannic compounds. Among the suitable stannic compounds are the stannic halides, and the alkyl stannic carboxylates. The stannic halide may be exemplified by stannic chloride, stannic bromide, and stannic iodide. The alkyl stannic carboxylates have the general formula $$(R_1)_x Sn(OOCR_2)_y$$

wherein $R_1$ and $R_2$ are alkyls and wherein $x$ and $y$ are whole numbers from 1 to 3, the sum of which is equal to four. The alkyls may be branched or straight chain. $R_2$ preferably contains from 1 to 18 carbon atoms and can be a stearate, palmitate, laurate, or the like. $R_1$ preferably contains 1 to 8 carbon atoms and may be methyl, propyl, butyl, isopropyl, isobutyl, hexyl, octyl or the like. Included among the many compounds coming within the scope of the foregoing are dibutyl tin diacetate, dipropyl tin diacetate, dioctyl tin diacetate, dibutyl tin distearate, dibutyl tin dipalmitate, dibutyl tin dilaurate, dibutyl tin maleate and the like.

Among the stannous tin compounds suitable for the purposes of this invention are the stannous dihalides, such as stannous chloride, stannous bromide, stannous iodine and the carboxylic acid salts of stannous tin. The latter include compounds having the formula $$Sn(-O-\overset{O}{\underset{\|}{C}}-R)_2$$

wherein R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl, or the like. Among the carboxylic acid salts suitable for the purpose of this invention are stannous oleate, stannous palmitate, stannous stearate, stannous caproate, stannous laurate, stannous naphthenate, stannous tartrate, stannous gluconate, stannous acetate, and the like. It is to be understood that any titanium or tin compound may be used in forming the initial coating on the glass, provided that such a compound is capable of forming an oxide on the glass surface at the reaction temperature indicated.

The glass articles coated with a thin transparent titanium or tin oxide layer as described above, thereafter enter the annealing lehr and are progressively cooled over a period of time to about 450° F. or lower and are then sprayed with an organic coating composition, preferably an aqueous medium containing polyvinyl alcohol and polyoxyethylene monostearate.

The organic coating composition can be applied by any suitable means such as a traversing spray nozzle at varying spray rates, such as about 1 quart of the mixture per 100 square feet of the lehr belt. Desirably, the spraying is done near the cold end of the lehr when the glassware is in a temperature range of about 100 to about 400° F.

Proportions of the polyvinyl alcohol and polyoxyethylene monostearate in the organic coating composition can vary over a wide range; the principal criterion for choosing amounts being a consideration of the practical application systems rather than any chemical criticality. The ratio of the polyvinyl alcohol to the polyoxyethylene monostearate should be greater than about 1:1 and can go as high as 10:1 and still function in a satisfactory manner. However, the lubricity has been observed to decrease as higher ratios are used. Accordingly, the preferred range of the ratio of the two materials; i.e., polyvinyl alcohol:polyoxyethylene monostearate, is on the order of about 1:1 to about 3:1.

The preferred vehicle for application of the coating is distilled water although it is to be understood that no criticality is attached thereto and other solvents, such as alcohols or ordinary water, may be used. Distilled water is recommended because impurities are kept out of the coating and there is less chance for undesirable chemical reactions to take place between the impurities and the coating ingredients. Moreover, with the use of distilled water, less maintenance on equipment is needed since the solvent is a major constituent of the mixture. As between water and organic solvents, the use of water in general is less hazardous to plant personnel than is the use of a more volatile solvent such as alcohol. In addition, organic solvents are more expensive than water, and, accordingly, from an economic standpoint water is the preferred solvent.

Although polyvinyl alcohol itself is not a suitable coating because of its water solubility and, as will subsequently be seen, the use of polyoxyethylene monostearate is likewise unacceptable as the sole organic coating, applicant has found that these ingredients may be advantageously combined to produce desired coating characteristics. It is believed, though not fully understood, that the polyvinyl alcohol functions to partially insolubilize the polyoxyethylene monostearate on the surface of the glass and imparts increased lubricity to the glass surface for ease in handling and filling operations.

This results in an improvement in the scratch resistance and protects against abrasion.

As pointed out hereinabove, glassware coated according to the methods of the prior art, although having improved durability and scratch resistance, frequently exhibits an accompanying drawback in that it is difficult to successfully apply the usual paper labeling adhesives to such treated surfaces. In many cases, the treated glass surfaces present a worse labeling surface than does the bare untreated glass. It has been observed in connection with the present invention that the labeling adhesives which are generally used in the industry have greater affinity for the surface modified according to the present invention than to glassware treated according to prior known methods.

The following examples serve to illustrate the present invention but are not to be considered limiting thereof in any way.

EXAMPLE I

A tetrabutyl titanate solution consisting of 1 part part by volume of titanate and 2 parts by volume of anhydrous n-butanol was prepared by dissolving the titanate ester in the solvent at room temperature. The solution thus obtained was sprayed, using compressed air, onto the exterior surface of glass bottles at the rate of 1 gallon per hour as they were continuously being conveyed from the bottle-forming machine to the annealing lehr. The temperature of the surface of the glass was about 1100° F. and the titanate was pyrolyzed almost immediately. A clear transparent coating formed upon the surface of the bottles which was hard but the bottles could nevertheless be scratched by firmly rubbing two containers against each other after they had been cooled to room temperature.

A number of the containers treated according to the foregoing where then used in the following treatment. A composition consisting of 0.5% by weight of polyvinyl alcohol and 0.25% by weight polyoxyethylene monostearate dissolved in 99.25% by weight distilled water was sprayed onto the cooled surfaces of the bottles using a traversing spray nozzle, at the rate of 1 quart of the mixture per 100 sq. ft. of the lehr belt. The spraying was done near the cold end of the annealing lehr through which the bottles were passing and where the temperature of the bottles was within the range of 100 to 400° F. In practice, the rate of application varies from about ½ to about 5 quarts per 100 sq. ft. of lehr belt.

At the conclusion of the treatment the bottles, now at room temperature, were observed to have a clear transparent coating which was hard and resisted scratching when two of the bottles were rubbed together. The following table of comparative data demonstrates that bottles coated according to the present invention exhibit superior resistance to scratching as evidenced by the pounds required to scratch the surface.

Table I

| Coating on bottle | Lbs. to scratch |
| --- | --- |
| No treatment | 2 |
| Titanium oxide coating only, applied as in Example I | 5 |
| Polyoxyethylene monostearate only, applied as in Example I | 15 |
| Titanium oxide coating plus polyvinyl alcohol and polyoxyethylene monostearate distilled water mixture coating of Example I | 70 |

The foregoing data shows the unexpected improvement achieved in scratch resistance represented by the great increase in the number of pounds required to produce a scratch on the specimen prepared according to the present invention when compared with a specimen receiving no chemical treatment, a specimen treated with the polyoxyethylene monostearate alone, and a specimen having only a $TiO_2$ coating.

As to the concentration of the polyvinyl alcohol and polyoxyethylene monostearate in the distilled water, it has been observed that as little as about .75% by weight produces the excellent results exhibited above. Of course, the amount can be further increased but the coatings produced using larger amounts will not be appreciably superior to the coating produced by the lower proportion of active ingredients in the mixture. Generally, the secondary coating is applied in the amount of about 0.05% of the active ingredients to about 5% active ingredient at a rate of about 1 quart per 100 sq. ft. of lehr belt. It is to be understood that both the rate of the concentration can be varied as desired.

EXAMPLE II

A tetra-isopropyl titanate chelated with acetyl acetonate in the ratio of 2 moles acetyl acetonate to 1 mole of the titanate was diluted with 2 parts by volume of isopropyl alcohol. The solution thus obtained was sprayed, using compressed air, onto the exterior surfaces of glass bottles at the rate of 0.2 to 0.4 gallon per hour as the bottles were continuously being conveyed from a bottle forming machine toward an annealing lehr. The temperature of the surfaces of the glass at the time of application was about 1100° F., and under these conditions the titanate pyrolyzed almost immediately. A clear transparent coating was formed upon the surface of the bottles, which coating was hard; however, the bottles could be scratched by firmly rubbing two containers against each other.

EXAMPLE III

A slight variant of the above example was utilized, in that the bottles were sprayed with the solution of tetra-isopropyl titanate chelated with acetyl acetonate, per se, and minus the diluent, isopropyl alcohol. In this example, the solution was sprayed by the technique disclosed in Example II, but at a lesser rate than was used in Example II. The titanate mixture pyrolyzed and formed a transparent titanium dioxide coating.

After the bottles were thus coated with titanium in accordance with one or the other of the above disclosed processes, they were treated in the same manner as described in Example I, i.e., by spraying thereon the polyvinyl alcohol-polyoxyethylene monostearate composition at the rate and with the temperature range indicated in Example I. Excellent scratch resistance properties were noted for the treated bottles.

In a general sense, the most important criterion for choosing the portions of the active ingredients used in the polyvinyl alcohol-polyoxyethylene monostearate composition will be in the matter of glassware manufacturing economics since it is understood that larger amounts can be used with equally satisfactory results; however, the improvement to be obtained does not necessarily increase in proportion to the cost of the ingredients used.

EXAMPLE IV

Stannic chloride was applied to the exterior surface of freshly formed glass containers as they were continuously being conveyed from the bottle forming machine to the annealing lehr. Dry air was bubbled through the liquid stannic chloride and this air stream, rich in stannic chloride, was directed to the transfer belt between the annealing lehr and the forming machine. A metal enclosure was placed over the transfer belt in order to confine the stannic chloride and air mixture in the vicinity of the freshly formed bottles. The temperature of the surface of the glass was about 1100° F., and the stannic chloride was pyrolyzed almost immediately. A clear transparent coating formed upon the surface of the bottles. While the coating was hard, the bottles could, nevertheless be scratched by firmly rubbing two of them against each other.

A number of the containers treated according to the foregoing were then used in the following treatment.

Mixtures of polyvinyl alcohol and polyoxyethylene monostearate were prepared using distilled water as the diluent. These mixtures, in the proportions indicated in Table II, were sprayed by means of a traversing spray nozzle at the rate of 1 quart of the mixture per 100 sq. ft. of lehr belt at the cold end of the lehr, where the bottle temperature was in the range of 100 to 400° F.

At the conclusion of the treatment the bottles were observed to have a clear transparent coating which was hard and resisted scratching when two of the bottles were rubbed together. As seen from the data in Table II, bottles coated according to the present invention exhibit superior resistance to scratching. This is evidenced by the force expressed in pounds, required to scratch the surface as determined by a scratch test machine. The machine is designed to abrade the surface of one glass bottle against the surface of a similar bottle, and is fully described and illustrated in copending application Ser. No. 355,252, filed Mar. 27, 1964. Thus, a bottle is fastened securely in a stationary low set of chucks, while a second bottle is fastened in a set of upper chucks, which are positioned so that the axes of the bottles are at 90° relative to each other. A test load is applied to the upper bottle while it is being driven at a constant speed of 2.8 inches per minute in a direction 45° to the axis of each bottle. The actual rate of scratch propagation on the bottles is then 2 inches per minute.

Using the foregoing test apparatus, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted. The force exerted by the second bottle is a known, measured force and, after each pass, the bottles are examined for scratches.

Another known method of evaluating the lubricious quality of a treated surface is by determining the angle of repose, with a low angle indicating a more lubricious surface. The angle of repose is determined by placing two bottles horizontally side by side on a supporting platform and then placing a third bottle, also in a horizontal position, directly upon the first two bottles so as to form a pyramid. One end of the supporting platform is then lifted slowly at a uniform rate so as to generate an angle with the horizontal. The angle of the platform to the horizontal at the time the third bottle begins to slide relative to the first two bottles, which are prevented from moving with respect to the platform, is referred to as the angle of repose. The more lubricious the surface, the lower will be the angle of repose. Apparatus for measuring the lubricity of glass surfaces are well-known in the art.

TABLE II

| Percent total solids (balance is distilled water) | Polyvinyl alcohol to polyoxyethylene monostearate ratio | Lbs. (force) required to produce light scratch | | Angle of repose | |
|---|---|---|---|---|---|
| | | Dry | Wet | Dry | Wet |
| 0.15 | 1:1 | 100 | 40 | 7 | 15 |
| 0.25 | 1:1 | 100+ | 55 | 8 | 16 |
| 0.25 | 2:1 | 100 | 55 | 8 | 18 |
| 0.25 | 4:1 | 100+ | 55 | 8 | 16 |
| 0.35 | 1:1 | 100+ | 100+ | 8 | 16 |
| 0.17 | ¹ 0:1 | 100 | 5 | 3 | 21 |
| 0.2 ² | | 5 | 5 | 40 | 42 |

¹ Polyoxyethylene monostearate only.
² No treatment-experimental control.

The foregoing data shows the improvement in the wet test performance of the polyoxyethylene monostearate and polyvinyl alcohol mixture over the performance of the polyoxyethylene monostearate coating above.

As to the concentration of polyvinyl alcohol and polyoxyethylene monostearate in the distilled water, it has been observed that as little as about 0.15% produces the excellent results exhibited above. This concentration is not intended to limit the invention in any way because in the final analysis the concentration is primarily determined by economic consideration.

What is claimed is:

1. A method for applying a label-accepting, protective coating to a glass surface comprising treating said surface with a member selected from the group consisting of a tin-containing compound and a titanium-containing compound which are pyrolyzable to form their respective metal oxides on said glass surface while said surface is at a temperature at least as high as the temperature at which said compounds pyrolyze and below the deformation temperature of said glass surface, cooling said treated surface to a temperature below 450° F., spraying onto said treated glass surface a mixture consisting essentially of polyvinyl alcohol and polyoxyethylene monostearate dispersed in a solvent in an amount sufficient to form a thin, tightly adherent, transparent, substantially colorless, coating on said surface and allowing said treated surface to cool to room temperature.

2. The method as defined in claim 1, wherein the titanium-containing compound is a tetraalkyl titanate.

3. The method as defined in claim 2, wherein the said tetraalkyl titanate is tetrabutyl titanate.

4. The method as defined in claim 2, wherein said tetraalkyl titanate is tetraisopropyl titanate.

5. The method as defined in claim 1, wherein the titanium-containing compound is titanium tetrahalide.

6. The method as defined in claim 5, wherein the titanium tetrahalide is titanium tetrachloride.

7. The method as defined in claim 1, wherein the tin-containing compound is a tin halide.

8. The method as defined in claim 7, wherein the tin halide is $SnCl_4$.

9. The method as defined in claim 7, wherein the tin halide is $SnCl_2$.

10. The method as defined in claim 1, wherein the tin-containing compound is an alkyl tin carboxylic acid salt.

11. The method as defined in claim 10, wherein the alkyl tin carboxylic acid salt is of the formula $$(R_1)_x Sn(OOCR_2)_y$$

wherein $R_1$ and $R_2$ are alkyl groups and wherein $x$ and $y$ are whole numbers from 1 to 3, the sum of which is equal to four.

12. The method as defined in claim 11, wherein said alkyl tin carboxylic acid salt compound is of the formula $$(R_1)_2 Sn(OOCR_2)_2$$

wherein $R_1$ is an alkyl having from 1 to 8 carbon atoms and $R_2$ is an alkyl having from 1 to 18 carbon atoms.

13. The method as defined in claim 12, wherein the alkyl tin carboxylic acid salt is dibutyl tin diacetate.

14. The method as defined in claim 1, wherein the ratio of polyvinyl alcohol to polyoxyethylene monostearate in said mixture is from about 1:1 to about 10:1.

15. The method as defined in claim 14, wherein said solvent is water and wherein the concentration of said mixture of polyvinyl alcohol and polyoxyethylene monostearate in said solvent is in the range of about .05 to 5 percent.

16. A glass container having a colorless, label-accepting, protective coating on its surface, said coating comprising immediately adjacent the glass surface a first layer of a member selected from the group consisting of titanium oxide and tin oxide, and a second layer bonded to said first layer, said second layer consisting essentially of the reaction product of a mixture of polyvinyl alcohol and polyoxyethylene monostearate.

17. A method for applying a label-accepting, protective coating to a glass surface comprising treating said surface with a member selected from the group consisting of a tin-containing compound and a titanium-containing compound which are pyrolyzable to form their respective metal oxides on said glass surface while said surface is at a temperature at least as high as the temperature at which said compounds pyrolyze and below the deformation temperature of said glass surface, cooling said treated surface, spraying onto said treated surface while said surface has a temperature in the range of about 100° F. to 400° F. a mixture consisting essentially of polyvinyl alcohol and polyoxyethylene monostearate dispersed in a solvent, the ratio of said polyvinyl alcohol to said polyoxyethylene monostearate being in the range of about 1:1 to about 4:1 and the concentration of said mixture in said solvent being in the range of about 0.15 to about 0.75 percent, and allowing said surface to cool to room temperature.

References Cited

UNITED STATES PATENTS

| | | |
|---|---|---|
| 2,813,045 | 11/1957 | Abbott. |
| 3,323,889 | 6/1967 | Carl et al. _____ 117—72 X |
| 3,352,707 | 11/1967 | Pickard. |
| 3,352,708 | 11/1967 | Lyon et al. |
| 3,357,853 | 12/1967 | Pickard. |

ALFRED L. LEAVITT, *Primary Examiner.*

H. COHEN, *Assistant Examiner.*

U.S. Cl. X.R.

117—124; 65—60